United States Patent
Gupta et al.

(10) Patent No.: US 11,333,034 B2
(45) Date of Patent: May 17, 2022

(54) NOZZLE VANE

(71) Applicant: MITSUBISHI HEAVY INDUSTRIES ENGINE & TURBOCHARGER, LTD., Sagamihara (JP)

(72) Inventors: Bipin Gupta, Tokyo (JP); Toyotaka Yoshida, Tokyo (JP); Yosuke Dammoto, Sagamihara (JP); Yoji Akiyama, Sagamihara (JP); Sambhav Jain, Sagamihara (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 0 days.

(21) Appl. No.: 17/056,839

(22) PCT Filed: Sep. 19, 2019

(86) PCT No.: PCT/JP2019/036691
§ 371 (c)(1),
(2) Date: Nov. 19, 2020

(87) PCT Pub. No.: WO2020/100420
PCT Pub. Date: May 22, 2020

(65) Prior Publication Data
US 2021/0199020 A1 Jul. 1, 2021

(30) Foreign Application Priority Data

Nov. 13, 2018 (WO) .................. PCT/JP2018/042040

(51) Int. Cl.
*F01D 17/16* (2006.01)

(52) U.S. Cl.
CPC .......... *F01D 17/16* (2013.01); *F05D 2220/40* (2013.01); *F05D 2240/121* (2013.01);
(Continued)

(58) Field of Classification Search
CPC ........ F01D 17/16; F01D 17/165; F02B 37/24; F05D 2240/40; F05D 2240/124
See application file for complete search history.

(56) References Cited

U.S. PATENT DOCUMENTS 8,641,382 B2   2/2014  Weber et al.
8,834,104 B2   9/2014  Mohamed et al.
(Continued)

FOREIGN PATENT DOCUMENTS

CN       1882764 A    12/2006
CN     102296995 A    12/2011
(Continued)

OTHER PUBLICATIONS

International Preliminary Report on Patentability and English translation of the Written Opinion of the International Searching Authority for International Application No. PCT/JP2018/042040, dated May 27, 2021.
(Continued)

*Primary Examiner* — Sabbir Hasan
(74) *Attorney, Agent, or Firm* — Birch, Stewart, Kolasch & Birch, LLP

(57) ABSTRACT

A nozzle vane for a variable geometry turbocharger has an airfoil including a leading edge, a trailing edge, a pressure surface, and a suction surface at least in a center position in a blade height direction. The airfoil satisfies $0 \leq W_{max}/L < 0.03$, where $W_{max}$ is a maximum value of a distance from a line segment connecting the trailing edge and a fixed point on the pressure surface at a 40% chord position from the trailing edge toward the leading edge to a given point on the pressure surface between the trailing edge and the fixed point, and L is a length of the line segment.

3 Claims, 8 Drawing Sheets

(52) U.S. Cl.
CPC .. *F05D 2240/122* (2013.01); *F05D 2240/123* (2013.01); *F05D 2240/124* (2013.01)

(56) References Cited

U.S. PATENT DOCUMENTS

| | | |
|---|---|---|
| 2007/0107426 A1 | 5/2007 | Castan |
| 2008/0131267 A1 | 6/2008 | Renaud et al. |
| 2008/0260528 A1 | 10/2008 | Weber et al. |
| 2009/0104023 A1 | 4/2009 | Favray et al. |
| 2011/0314808 A1 | 12/2011 | Mohamed et al. |
| 2014/0360160 A1 | 12/2014 | Sun et al. |
| 2015/0159502 A1 | 6/2015 | Laubender et al. |

FOREIGN PATENT DOCUMENTS

| | | |
|---|---|---|
| DE | 102013224572 A1 | 6/2015 |
| EP | 1 797 283 B1 | 12/2013 |
| JP | 3605398 B2 | 12/2004 |
| JP | 2007-524022 A | 8/2007 |
| JP | 2008-520881 A | 6/2008 |
| JP | 2009-517578 A | 4/2009 |
| JP | 2009-215990 A | 9/2009 |
| WO | WO 2006/053579 A1 | 5/2006 |

OTHER PUBLICATIONS

Chinese Office Action and Search Report, dated Aug. 3, 2021, for Chinese Application No. 201980014505.4, with an English translation of the Chinese Office Action.

English translation of the Written Opinion of the International Searching Authority for International Application No. PCT/JP2019/036691, dated Dec. 14, 2020.

International Search Report and Written Opinion of the International Searching Authority for International Application No. PCT/JP2018/042040, dated Jan. 29, 2019.

International Search Report and Written Opinion of the International Searching Authority for International Application No. PCT/JP2019/036691, dated Nov. 26, 2019.

NOZZLE VANE

TECHNICAL FIELD

The present disclosure relates to a nozzle vane for a variable geometry turbocharger.

BACKGROUND

In recent years, a variable geometry turbocharger capable of changing a flow characteristic of the exhaust gas by adjusting the opening degree of a nozzle has been mounted on an automobile for the purpose of improving the fuel efficiency. A configuration of such a variable geometry turbocharger is disclosed in Patent Documents 1 to 4. A nozzle vane provided to the conventional variable geometry turbocharger is generally configured such that the pressure surface is convexly curved toward the turbine wheel in the vicinity of the leading edge and is concavely curved with respect to the turbine wheel in the vicinity of the trailing edge.

CITATION LIST

Patent Literature

Patent Document 1: U.S. Pat. No. 8,641,382B
Patent Document 2: U.S. Pat. No. 8,834,104B
Patent Document 3: WO2006/053579A
Patent Document 4: JP3605398B

SUMMARY

Problems to be Solved

The variable geometry turbocharger is provided with an actuator configured to rotate a nozzle vane for adjusting the opening degree of the nozzle. The nozzle vane rotates with a torque that is the sum of the torque provided by the actuator, the torque provided by the exhaust gas, and the friction that acts upon rotation of the nozzle vane. At this time, as the flow rate changes according to the nozzle opening degree, the torque applied to the nozzle vane changes. At this time, if the friction is large relative to the force (vane torque) that the nozzle vane receives from the fluid, the rotation of each nozzle vane varies, and the nozzle opening degree varies in the circumferential direction. When such a phenomenon occurs, even when the nozzle is controlled to have a predetermined opening degree, the flow rate of the exhaust gas flowing through the turbine wheel may vary, which may adversely affect the performance of the engine.

To suppress such a variation phenomenon, it is necessary to increase the torque in the opening direction provided by the exhaust gas, in other words, when the exhaust gas flows between nozzle vanes, decrease the static pressure generated on the pressure surface in the vicinity of the trailing edge of the nozzle vane and increase the static pressure difference between the pressure side and the suction side. In the configuration in which the pressure surface is concavely curved with respect to the turbine wheel as with the nozzle vane of the conventional variable geometry turbocharger, the static pressure generated on the pressure surface in the vicinity of the trailing edge of the nozzle vane cannot be decreased.

In view of the above, an object of at least one embodiment of the present disclosure is to provide a nozzle vane whereby it is possible to increase the torque in the opening direction provided by exhaust gas in a variable geometry turbocharger.

Solution to the Problems (1) A nozzle vane according to at least one embodiment of the present invention is a nozzle vane for a variable geometry turbocharger, having an airfoil including a leading edge, a trailing edge, a pressure surface, and a suction surface at least in a center position in a blade height direction, wherein the airfoil satisfies $0 \leq W_{max}/L < 0.03$, where $W_{max}$ is a maximum value of a distance from a line segment connecting the trailing edge and a fixed point on the pressure surface at a 40% chord position from the trailing edge toward the leading edge to a given point on the pressure surface between the trailing edge and the fixed point, and L is a length of the line segment.

In the variable geometry turbocharger, the exhaust gas having passed through the turbine scroll of spiral shape forms an arc-shaped curved flow in a respective flow passage formed between adjacent nozzle vanes. This flow is convexly curved toward the pressure surface which defines the respective flow passage. In a free vortex, generally, the flow velocity of the fluid increases toward the inner side. When this principle is applied to the flow of the exhaust gas that is curved convexly toward the pressure surface, the closer to the suction surface which defines the flow passage together with the pressure surface, the higher the flow velocity of the exhaust gas.

With the above configuration (1), a substantially flat portion exists in the vicinity of the trailing edge on the pressure surface. With this configuration, as compared with a configuration in which this portion is concavely curved, the pressure surface approximates the suction surface that forms the flow passage together with the pressure surface. As a result, the flow velocity of the exhaust gas along the pressure surface increases in the vicinity of the trailing edge, so that the static pressure generated on the pressure surface in the vicinity of the trailing edge decreases. When the static pressure generated on the pressure surface in the vicinity of the trailing edge decreases, the static pressure difference between the pressure side and the suction side in the vicinity of the trailing edge decreases. Thus, it is possible to increase the torque in the opening direction provided by the exhaust gas to the nozzle vane.

(2) In some embodiments, in the above configuration (1), the nozzle vane has a hub-side edge and a tip-side edge, and the nozzle vane has the airfoil at least in a region from 30 to 70% of a blade height from the hub-side edge in a direction from the hub-side edge to the tip-side edge.

With the above configuration (2), a substantially flat portion exists in a relatively wide region including the blade height center position in the vicinity of the trailing edge on the pressure surface. Since the range with the decreased static pressure is extended as the substantially flat portion is extended in the blade height direction, it is possible to further increase the torque in the opening direction provided by the exhaust gas to the nozzle vane.

(3) In some embodiments, in the above configuration (1) or (2), in the airfoil, a camber line at an equal distance from the pressure surface and the suction surface is linear at least in a range from the trailing edge to a 40% chord position from the trailing edge toward the leading edge, and the camber line does not intersect a chord line connecting the leading edge and the trailing edge between the leading edge and the trailing edge.

With the above configuration (3), it is possible to prevent a complicated configuration of the suction surface even when the pressure surface has the above configuration (1) or (2).

(4) In some embodiments, in the above configuration (3), in the airfoil, the suction surface is configured such that a curvature of a region connected to the leading edge is greater than a curvature of a region connected to the trailing edge.

When the exhaust gas mass flow rate is large, the rotation angle of the nozzle vane in the opening direction increases. Accordingly, the exhaust gas enters the nozzle vane from the turbine scroll at an angle such that separation occurs in the vicinity of the leading edge on the suction surface. Thus, the static pressure decreases in the vicinity of the leading edge on the suction surface, and the pressure difference between the pressure side and the suction side in the vicinity of the leading edge increases, so that the force (moment) in the opening direction generated on the leading edge side of the nozzle vane increases. When the moment in the opening direction generated on the leading edge side of the nozzle vane increases, the torque in the opening direction provided by the exhaust gas to the nozzle vane is significantly increased, so that the actuator may be damaged. With the above configuration (4), since the curvature and thickness on the leading edge side of the suction surface are increased, the occurrence of separation is suppressed, and the reduction in static pressure on the suction surface in the vicinity of the leading edge is suppressed. Thus, the increase in moment in the opening direction generated on the leading edge side of the nozzle vane is suppressed. Consequently, it is possible to suppress the increase in torque in the opening direction provided by the exhaust gas to the nozzle vane.

Advantageous Effects

According to at least one embodiment of the present disclosure, a substantially flat portion exists in the vicinity of the trailing edge on the pressure surface. With this configuration, as compared with a configuration in which this portion is concavely curved, the pressure surface approximates the suction surface that forms the flow passage together with the pressure surface. As a result, the flow velocity of the exhaust gas along the pressure surface increases in the vicinity of the trailing edge, so that the static pressure generated on the pressure surface in the vicinity of the trailing edge decreases. When the static pressure generated on the pressure surface in the vicinity of the trailing edge decreases, the static pressure difference between the pressure side and the suction side in the vicinity of the trailing edge decreases. Thus, it is possible to increase the torque in the opening direction provided by the exhaust gas to the nozzle vane.

DETAILED DESCRIPTION

Embodiments of the present invention will now be described in detail with reference to the accompanying drawings. However, the scope of the present invention is not limited to the following embodiments. It is intended that dimensions, materials, shapes, relative positions and the like of components described in the embodiments shall be interpreted as illustrative only and not intended to limit the scope of the present invention.

First Embodiment

Figure 1:
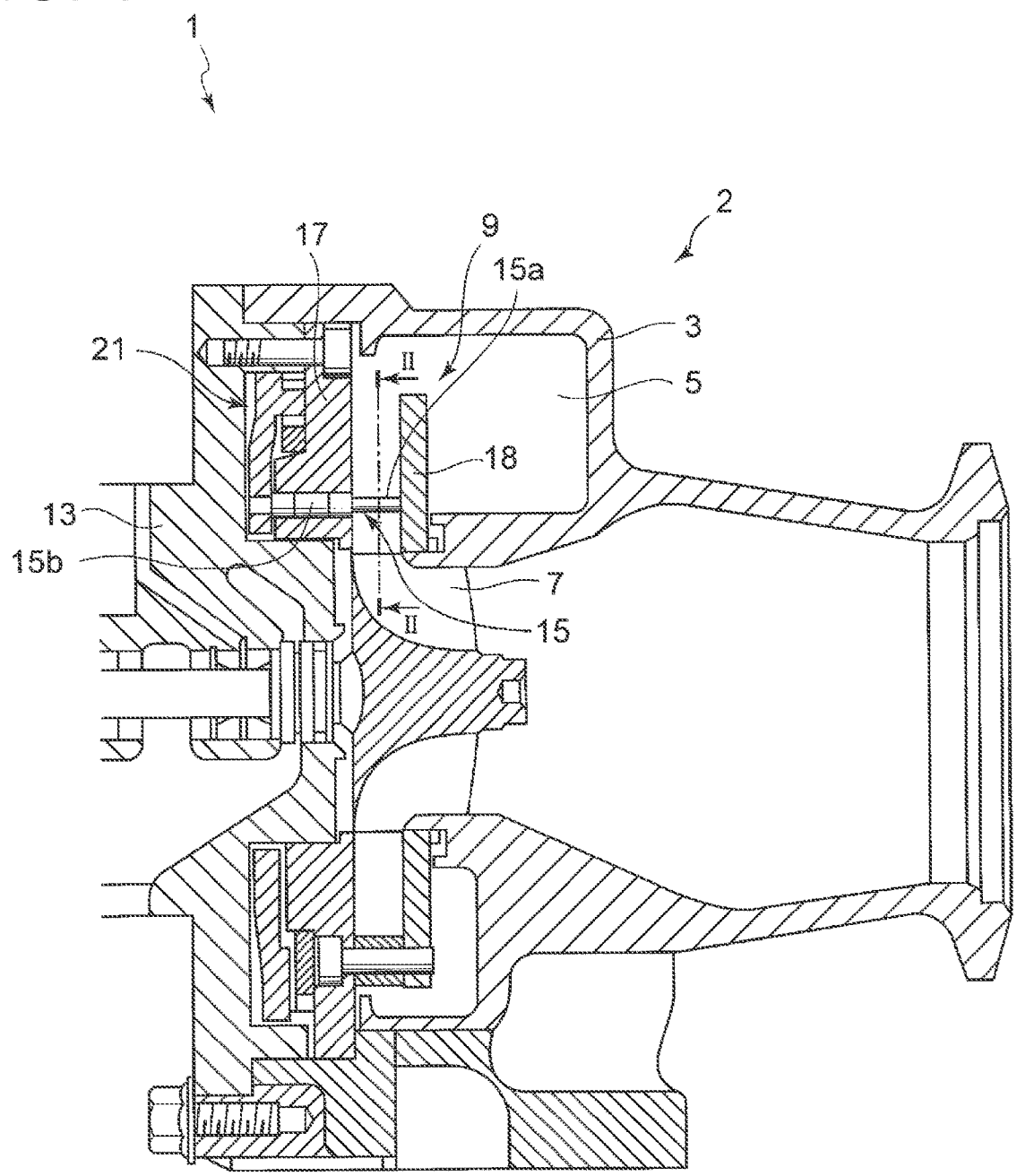
FIG. 1 is a cross-sectional view of a turbine of a variable geometry turbocharger including a nozzle vane according to a first embodiment of the present disclosure.

As shown in FIG. 1, a turbine 2 of a variable geometry turbocharger 1 includes a turbine housing 3 having a turbine scroll 5 of spiral shape, a turbine wheel 7 rotatably disposed on the radially inner side of the turbine scroll 5 in the turbine housing 3, and a variable nozzle mechanism 9 for controlling the flow passage area of the exhaust gas flowing from the turbine scroll 5 to the turbine wheel 7.

The variable nozzle mechanism 9 includes a nozzle 15, a nozzle mount 17 fixed to a bearing housing 13, and a nozzle plate 18. The nozzle 15 has a plurality of nozzle vanes 15a disposed so as to surround the turbine wheel, and a nozzle shaft 15b fixed to each nozzle vane 15a. Each nozzle shaft 15b is rotatably supported to the nozzle mount 17. Each nozzle shaft 15b is connected to an actuator (not shown) via a link mechanism 21. Each nozzle shaft 15b rotates by the torque provided by the actuator. With rotation of each nozzle shaft 15b, the nozzle vane 15a rotates.

Figure 2:
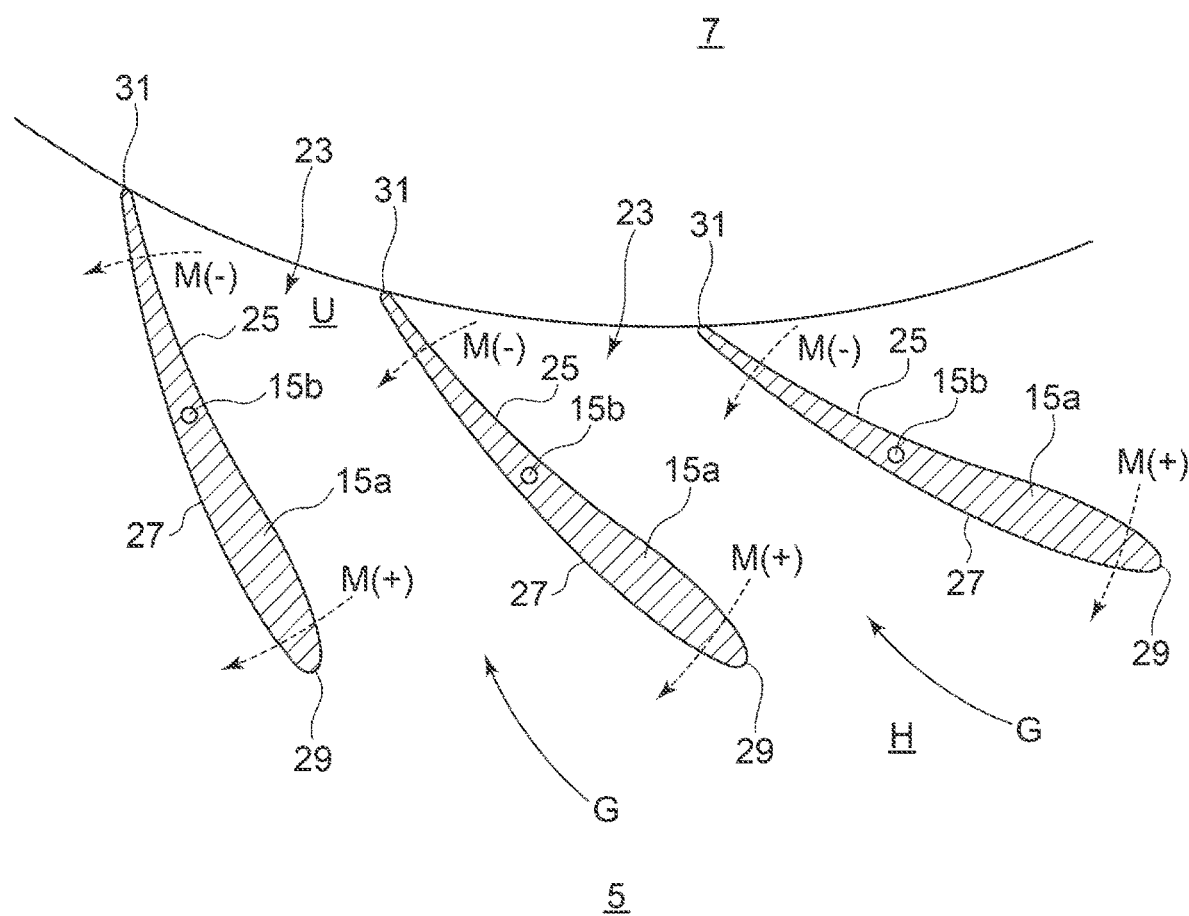
FIG. 2 is a cross-sectional view taken along line II-II in FIG. 1.

As shown in FIG. 2, a flow passage 23 is formed between adjacent nozzle vanes 15a, 15a, through which the exhaust gas G having passed through the turbine scroll 5 flows. Across the flow passage 23, a side of the turbine scroll 5 on the outer peripheral side is a high-pressure side H due to the exhaust gas G, and a side of the turbine wheel 7 on the inner peripheral side is a low-pressure side U. The exhaust gas having passed through the turbine scroll 5 flows into the flow passage 23 at a certain flow angle. At this time, the pressure is increased on the pressure surface 25 which faces the flow, while the pressure is low on the suction surface 27. Due to this pressure difference, with the nozzle shaft 15b being the center of rotation, moment M(+) in the direction of opening the flow passage 23 is applied to the leading edge 29 of the nozzle vane 15a, and moment M(−) in the direction of closing the flow passage 23 is applied to the trailing edge 31 of the nozzle vane 15a. The torque provided by the exhaust gas G to the nozzle vane 15a is defined by the balance of the moments M(−) and M(+).

Figure 3:
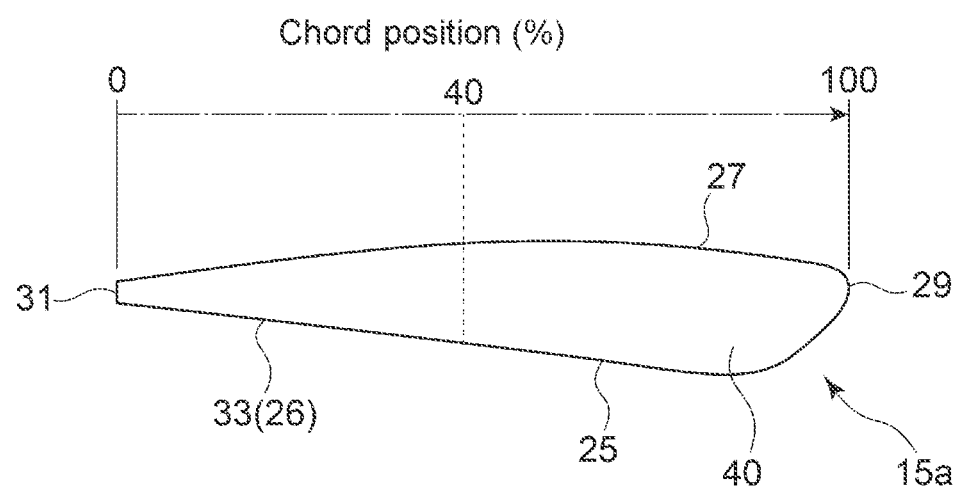
FIG. 3 is a diagram showing the airfoil in the blade height center position of the nozzle vane according to the first embodiment of the present disclosure.

FIG. 3 shows an airfoil 40 in the blade height center position of the nozzle vane 15a. In the airfoil 40, the pressure surface 25 includes a linear portion 33 in a range from the trailing edge 31 to the 40% chord position from the trailing edge 31 toward the leading edge 29. In other words, the pressure surface 25 has a flat portion 26 in a range from the trailing edge 31, toward the leading edge 29, to the 40% chord position in the blade height center position of the nozzle vane 15a.

Next, the operation of the variable geometry turbocharger 1 will be described. As shown in FIG. 2, according to the flow rate of the exhaust gas G from the turbine scroll 5, the actuator (not shown) rotates each nozzle shaft 15b via the link mechanism 21, and the rotation of each nozzle shaft 15b rotates the nozzle vane 15a. At this time, the nozzle vane 15a is rotated with a torque that is the sum of the torque provided by the actuator, the torque provided by the exhaust gas G, and the friction that acts upon rotation of each nozzle vane 15a. When each nozzle vane 15a rotates, the flow passage area of each flow passage 23 changes, i.e., the opening degree of the nozzle 15 changes, so that the opening degree control for the nozzle 15 is performed based on the flow rate of the exhaust gas G.

When the torque provided by the actuator to the nozzle vane 15a for controlling the nozzle 15 to a predetermined opening degree is small as the flow rate of the exhaust gas G is small, the torque provided by the exhaust gas G is also small, so that the summed torque has a small value in the opening direction of the nozzle 15 or a value in the closing direction of the nozzle 15. As a result, the rotation of each nozzle vane 15a may vary, and the opening degree of the nozzle 15 may vary in the circumferential direction. When such a phenomenon occurs, even when the nozzle 15 is controlled to have a predetermined opening degree, the flow rate of the exhaust gas G flowing through the turbine wheel 7 may vary, which may adversely affects the performance of the engine equipped with the variable geometry turbocharger 1 (see FIG. 1).

Figure 4:
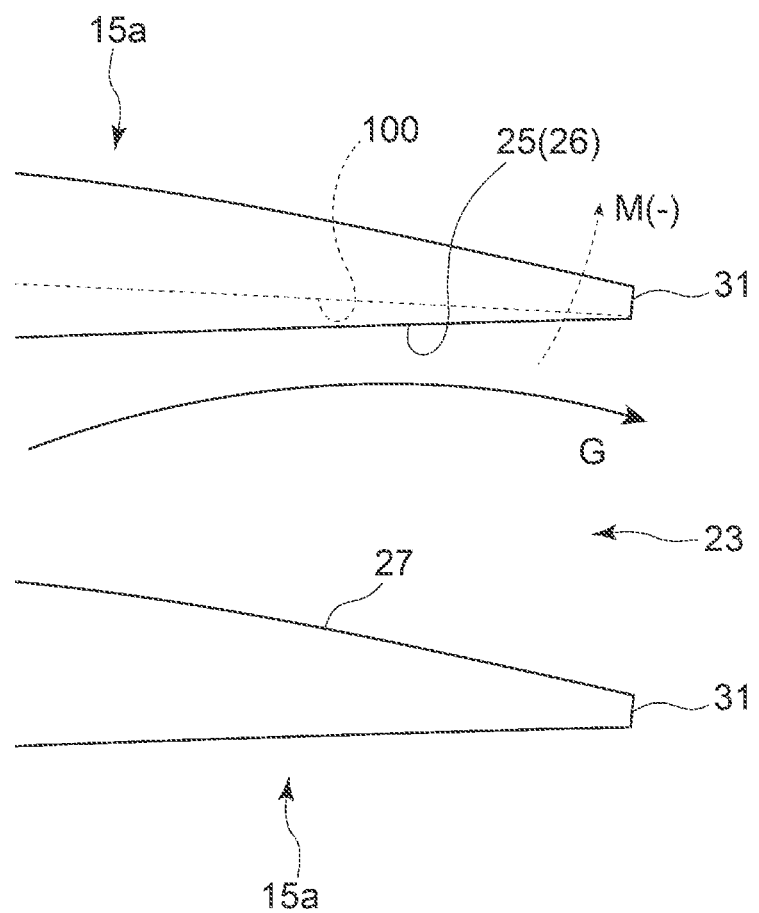
FIG. 4 is a diagram for describing the principle of increasing the torque on the pressure surface in the vicinity of the trailing edge of the nozzle vane according to the first embodiment of the present disclosure.

However, as shown in FIG. 3, in the nozzle vane 15a according to the first embodiment, since the pressure surface 25 has the flat portion 26 in a range from the trailing edge 31, toward the leading edge 29, to the 40% chord position in the blade height center position, it is possible to achieve the effect of decreasing the moment M(−) in the closing direction on the trailing edge 31 side of the nozzle vane 15a. The principle of achieving this effect will now be described with reference to FIG. 4.

The exhaust gas G having passed through the turbine scroll 5 (see FIG. 1) of spiral shape forms an arc-shaped curved flow in each flow passage 23. This flow is convexly curved toward the pressure surface 25 which defines the flow passage 23. In a free vortex, generally, the flow velocity of the fluid increases toward the inner side. When this principle is applied to the flow of the exhaust gas G that is curved convexly toward the pressure surface 25, the closer to the suction surface 27 which defines the flow passage 23 together with the pressure surface 25, the higher the flow velocity of the exhaust gas G.

As with the nozzle vane 15a according to the present embodiment, when the flat portion 26 exists in the vicinity of the trailing edge 31 on the pressure surface 25, as compared with a configuration 100 in which this portion is concavely curved, the pressure surface 25 approximates the suction surface 27 that defines the flow passage 23 together with the pressure surface 25. As a result, the flow velocity of the exhaust gas along the pressure surface 25 increases in the vicinity of the trailing edge 31, so that the static pressure generated on the pressure surface 25 in the vicinity of the trailing edge 31 decreases. When the static pressure generated on the pressure surface 25 in the vicinity of the trailing edge 31 decreases, the static pressure difference between the pressure surface 25 side and the suction surface 27 side in the vicinity of the trailing edge 31 decreases, so that the moment M(−) in the closing direction on the trailing edge 31 side of the nozzle vane 15a decreases.

When the moment M(−) in the closing direction on decreases, the vane torque with respect to the friction can be increased in the direction of opening the nozzle 15. Thus, it is possible to suppress the variation in rotation of each nozzle vane 15a and the variation in opening degree of the nozzle 15 in the circumferential direction. As a result, the nozzle 15 can be reliably controlled to a predetermined opening degree, and the exhaust gas G flows to the turbine wheel 7 at a flow rate according to the opening degree of the nozzle 15. Thus, it is possible to reduce the adverse effect on the performance of the engine equipped with the variable geometry turbocharger 1 (see FIG. 1).

As described above, when the flat portion 26 exists in the vicinity of the trailing edge 31 on the pressure surface 25, as compared with a configuration 100 in which this portion is concavely curved, the pressure surface 25 approximates the suction surface 27 that forms the flow passage 23 together with the pressure surface 25. As a result, the flow velocity of the exhaust gas G along the pressure surface 25 increases in the vicinity of the trailing edge 31, so that the static pressure generated on the pressure surface 25 in the vicinity of the trailing edge 31 decreases. When the static pressure generated on the pressure surface 25 in the vicinity of the trailing edge 31 decreases, the static pressure difference between the pressure surface 25 side and the suction surface 27 side in the vicinity of the trailing edge 31 decreases. Thus, it is possible to increase the torque in the opening direction provided by the exhaust gas G to the nozzle vane 15a.

In the first embodiment, as shown in FIG. 3, the flat portion 46 is formed in a range from the trailing edge 31, toward the leading edge 29, to the 40% chord position, but the embodiment is not limited thereto. The flat portion 26 is formed at least in a range from the trailing edge 31, toward the leading edge 29, to the 40% chord position, and the flat portion 26 may be further extended from the 40% chord position toward the leading edge 29.

Figure 5:
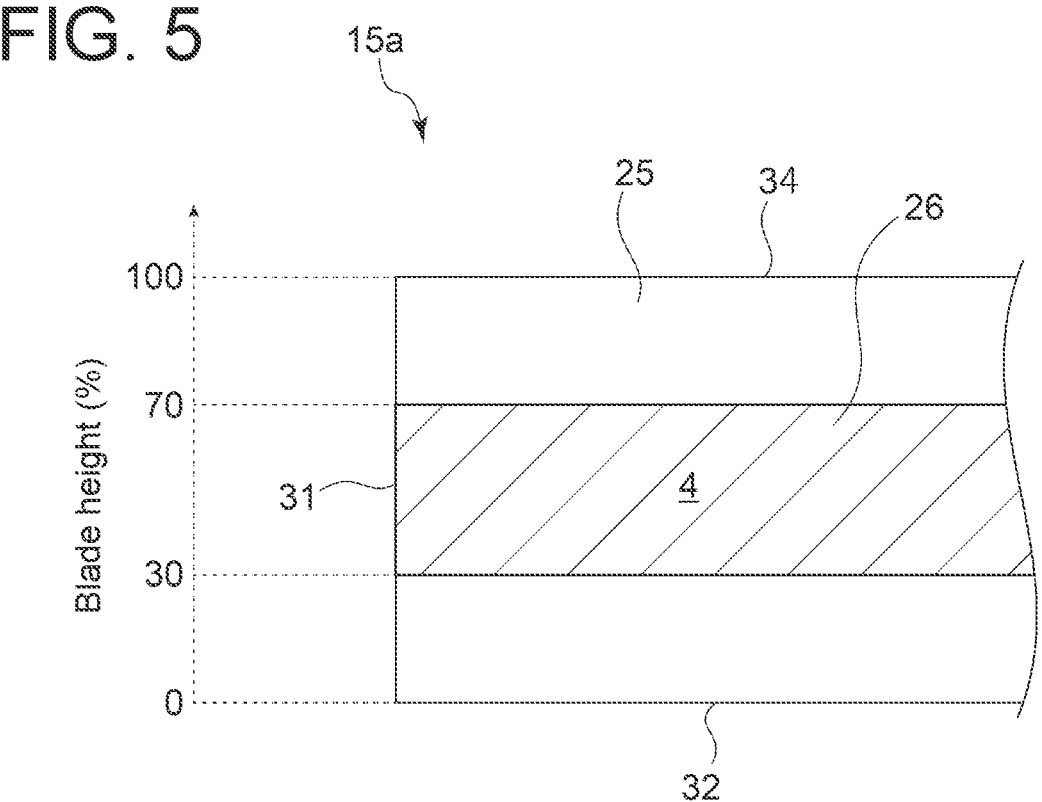
FIG. 5 is a configuration diagram of the pressure surface in the vicinity of the trailing edge of a modified example of the nozzle vane according to the first embodiment of the present disclosure.

In the first embodiment, the flat portion 46 is formed in the blade height center position of the nozzle vane 15a, but the embodiment is not limited thereto. The flat portion 46 is formed at least in the blade height center position of the nozzle vane 15a, and as shown in FIG. 5, the flat portion 26 may be formed at least in a region A of 30 to 70% blade height from the hub-side edge 32 in a direction from the hub-side edge 32 to the tip-side edge 34. Since the range with large static pressure is extended as the flat portion 26 is extended in the blade height direction, it is possible to decrease the moment M(−) (see FIG. 4) in the closing direction on the trailing edge 31 side of the nozzle vane 15a. Accordingly, in order to further decrease the moment M(−) in the closing direction, the flat portion 26 may be formed in a wider region than the region A. The flat portion 26 may be formed over the entire blade height from the hub-side edge 32 to the tip-side edge 34.

Figure 6:
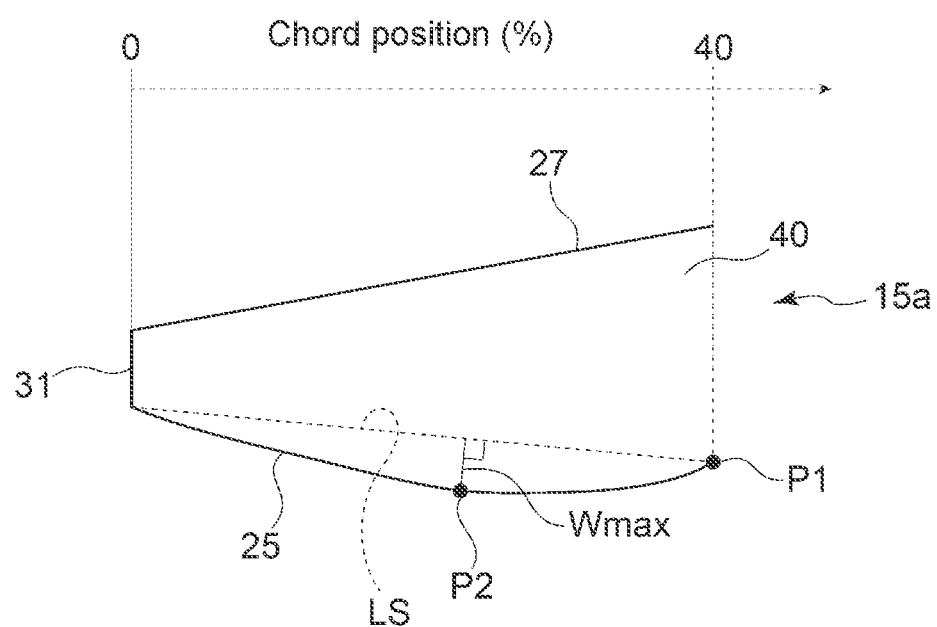
FIG. 6 is a configuration diagram of the pressure surface in the vicinity of the trailing edge of another modified example of the nozzle vane according to the first embodiment of the present disclosure.

In the first embodiment, the flat portion 46 is completely flat, but the embodiment is not limited thereto. As shown in FIG. 6, the airfoil 40 may satisfy $0 \leq (W_{max}/L) < 0.03$, where $W_{max}$ is a maximum value of the distance from a line segment LS connecting the trailing edge 31 and a fixed point P1 on the pressure surface 25 at a 40% chord position from the trailing edge 31 toward the leading edge 29 (see FIG. 3) to a given point P2 on the pressure surface 25 between the trailing edge 31 and the fixed point P1, and L is the length of the line segment LS. In FIG. 6, in a range from the trailing edge 31, toward the leading edge 29, to the 40% chord position, the pressure surface 25 is curved convexly with respect to the line segment LS in a direction opposite to the suction surface 27. However, the pressure surface 25 may be curved concavely with respect to the line segment LS toward the suction surface 27, or may have at least one convexly curved portion and at least one concavely curved portion. This embodiment means that the flat portion 26 may not necessarily completely flat, but may be a substantially flat portion including some convex or concave curves.

Second Embodiment

Next, the nozzle vane according to the second embodiment will be described. Although the configuration of the suction surface 27 is not particularly stated in the first embodiment, in the nozzle vane according to the second embodiment, with respect to the first embodiment, the configuration of the suction surface 27 is limited. In the second embodiment, the same constituent elements as those in the first embodiment are associated with the same reference numerals and not described again in detail.

Figure 7:
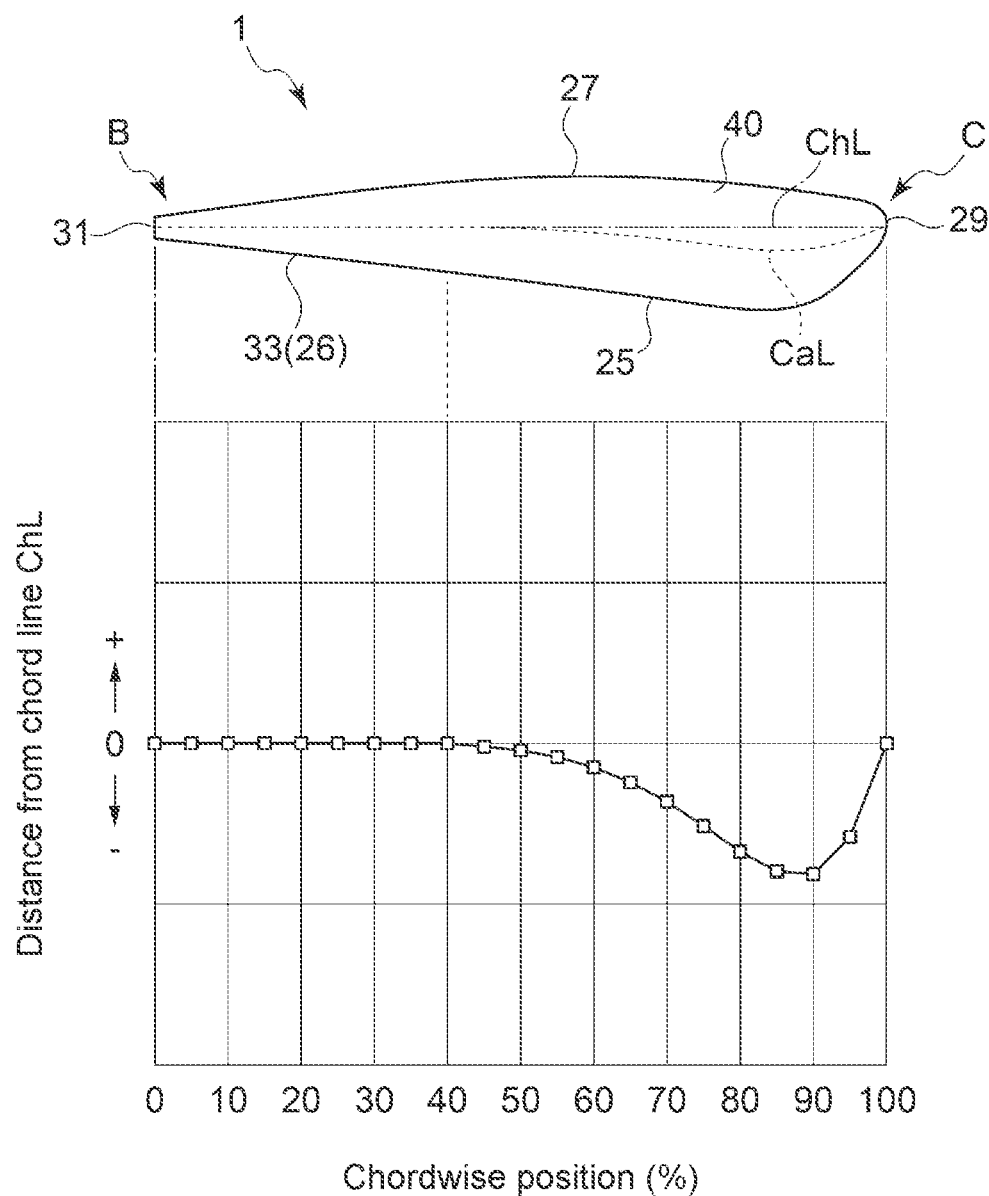
FIG. 7 is a diagram showing the airfoil in the blade height center position of the nozzle vane according to a second embodiment of the present disclosure.

As shown in FIG. 7, the nozzle vane 15a according to the second embodiment of the present disclosure has an airfoil 40 with the pressure surface 25 of the same shape as the first embodiment. On the other hand, with respect to the pressure surface 25 of the same shape as the first embodiment, the suction surface 27 is shaped such that the camber line CaL at an equal distance from the pressure surface 25 and the suction surface 27 has the following feature. The configuration is otherwise the same as that of the first embodiment.

The graph of FIG. 7 shows the shape of the camber line CaL in the airfoil 40 of the nozzle vane 15a according to the second embodiment of the present disclosure. In this graph, the horizontal axis represents the chord position of the nozzle vane 15a, and the vertical axis represents the distance from the chord line ChL connecting the leading edge 29 and the trailing edge 31. The distance is taken as positive in a direction from the chord line ChL to the suction surface 27.

The camber line CaL is linear in a range of 0% to 40% chord positions. The camber line CaL is curved with respect to the chord line ChL on the pressure surface 25 side in a range of 40% to 100% chord positions. Accordingly, the camber line CaL does not intersect the chord line ChL between the leading edge 29 and the trailing edge 31. In other words, the distance from the chord line ChL to the camber line CaL does not change from a negative value to a positive value between the leading edge 29 and the trailing edge 31 (no inflexion point at which the sign of the distance changes exist between the leading edge 29 and the trailing edge 31). In the nozzle vane 15a according to the second embodiment of the present disclosure, since the camber line CaL is shaped in this way in the airfoil 40 with the pressure surface 25 of the same shape as the first embodiment of the present disclosure, it is possible to prevent the configuration of the suction surface 27 from being complicated.

Further, in the airfoil 40 of the nozzle vane 15a according to the second embodiment of the present disclosure, the suction surface 27 may be configured such that the curvature of a region C connected to the leading edge 29 is greater than the curvature of a region B connected to the trailing edge 31.

As described with reference to the first embodiment, when the exhaust gas mass flow rate is large, the opening degree of the nozzle 15 increases, so that the rotation angle of the nozzle vane in the opening direction increases. Accordingly, the exhaust gas enters the nozzle vane 15a from the turbine scroll 5 (see FIG. 1) at an angle such that separation occurs in the vicinity of the leading edge 29 on the suction surface 27. Thus, the static pressure decreases in the vicinity of the leading edge 29 on the suction surface 27, so that the moment M(+) (see FIG. 2) in the opening direction generated on the leading edge 29 side of the nozzle vane 15a increases. When the moment M(+) in the opening direction generated on the leading edge 29 side of the nozzle vane 15a increases, the torque in the opening direction provided by the exhaust gas to the nozzle vane 15a is significantly increased, so that the actuator may be damaged. With the configuration of the second embodiment, since the curvature and thickness on the leading edge 29 side of the suction surface 27 are increased, the occurrence of separation is suppressed, and the reduction in static pressure on the suction surface 27 in the vicinity of the leading edge 29 is suppressed. Thus, the increase in moment M(+) in the opening direction generated on the leading edge 29 side of the nozzle vane 15a is suppressed. Consequently, it is possible to suppress the increase in torque in the opening direction provided by the exhaust gas to the nozzle vane 15a.

Figure 8:
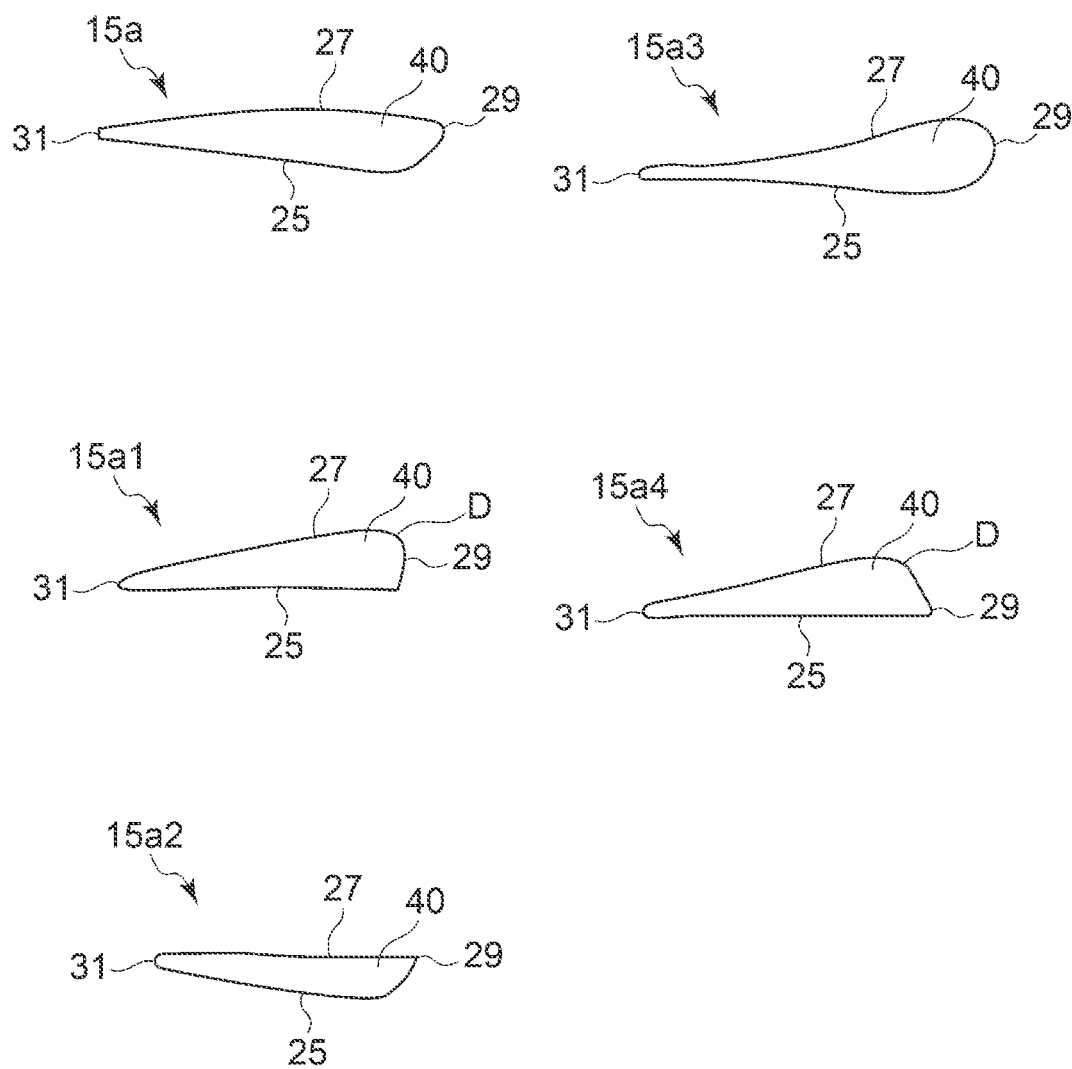
FIG. 8 is a diagram showing the airfoil in the blade height center position of modified examples of the nozzle vane according to the second embodiment of the present disclosure.

FIG. 8 shows, in addition to the nozzle vanes 15a which have been specifically described in the first and second embodiments, modified examples thereof. A nozzle vane 15a1, which is one of the modified examples, has the airfoil 40 in which the pressure surface 25 is substantially flat from the trailing edge 31 to the leading edge 29, compared with the nozzle vane 15a. A nozzle vane 15a2, which is another of the modified examples, has the airfoil 40 in which the suction surface 27 is substantially flat from the trailing edge 31 to the leading edge 29, compared with the nozzle vane 15a. A nozzle vane 15a3, which is another of the modified examples, has the airfoil 40 in which the curvature in the vicinity of the leading edge 29 on the suction surface 27 is increased, compared with the nozzle vane 15a. A nozzle vane 15a4, which is another of the modified examples, has the airfoil 40 in which a portion D with increased curvature on the suction surface 27 is moved to the trailing edge 31 side, compared with the nozzle vane 15a.

REFERENCE SIGNS LIST

1 Variable geometry turbocharger
2 Turbine
3 Turbine housing
5 Turbine scroll
7 Turbine wheel
9 Variable nozzle mechanism
13 Bearing housing
15 Nozzle
15a Nozzle vane
15b Nozzle shaft
17 Nozzle mount
18 Nozzle plate
21 Link mechanism
23 Flow passage
25 Pressure surface
26 Flat portion
27 Suction surface
29 Leading edge
31 Trailing edge
32 Hub-side edge
33 Linear portion
34 Tip-side edge
40 Airfoil
B Region connected to trailing edge C Region connected to leading edge
CaL Camber line
ChL Chord line
G Exhaust gas
LS Line segment
P1 Fixed point
P2 Given point on pressure surface between trailing edge and fixed point

The invention claimed is:

1. A nozzle vane for a variable geometry turbocharger, wherein the nozzle vane has an airfoil including a leading edge, a trailing edge, a pressure surface, and a suction surface at least in a center position in a blade height direction,
wherein the airfoil satisfies $0 \leq W_{max}/L < 0.03$, where $W_{max}$ is a maximum value of a distance from a line segment connecting the trailing edge and a fixed point on the pressure surface at a 40% chord position from the trailing edge toward the leading edge to a given point on the pressure surface between the trailing edge and the fixed point, and L is a length of the line segment, and
wherein, in the airfoil, a camber line at an equal distance from the pressure surface and the suction surface is linear at least in a range from the trailing edge to the 40% chord position from the trailing edge toward the leading edge, the camber line includes a portion curved toward the pressure surface with respect to a chord line connecting the leading edge and the trailing edge between the leading edge and the trailing edge in a range from 40 to 100% chord positions.

2. The nozzle vane according to claim 1,
wherein the nozzle vane has a hub-side edge and a tip-side edge, and
wherein the nozzle vane has the airfoil at least in a region from 30 to 70% of a blade height from the hub-side edge in a direction from the hub-side edge to the tip-side edge.

3. The nozzle vane according to claim 1,
wherein, in the airfoil, the suction surface is configured such that a curvature of a region connected to the leading edge is greater than a curvature of a region connected to the trailing edge.

* * * * *